Dec. 20, 1966   P. G. IVANCHICH   3,292,442
SHIFT LINKAGE FOR MANUALLY CONTROLLED
POWER TRANSMISSION MECHANISM
Filed Nov. 2, 1964   4 Sheets-Sheet 1
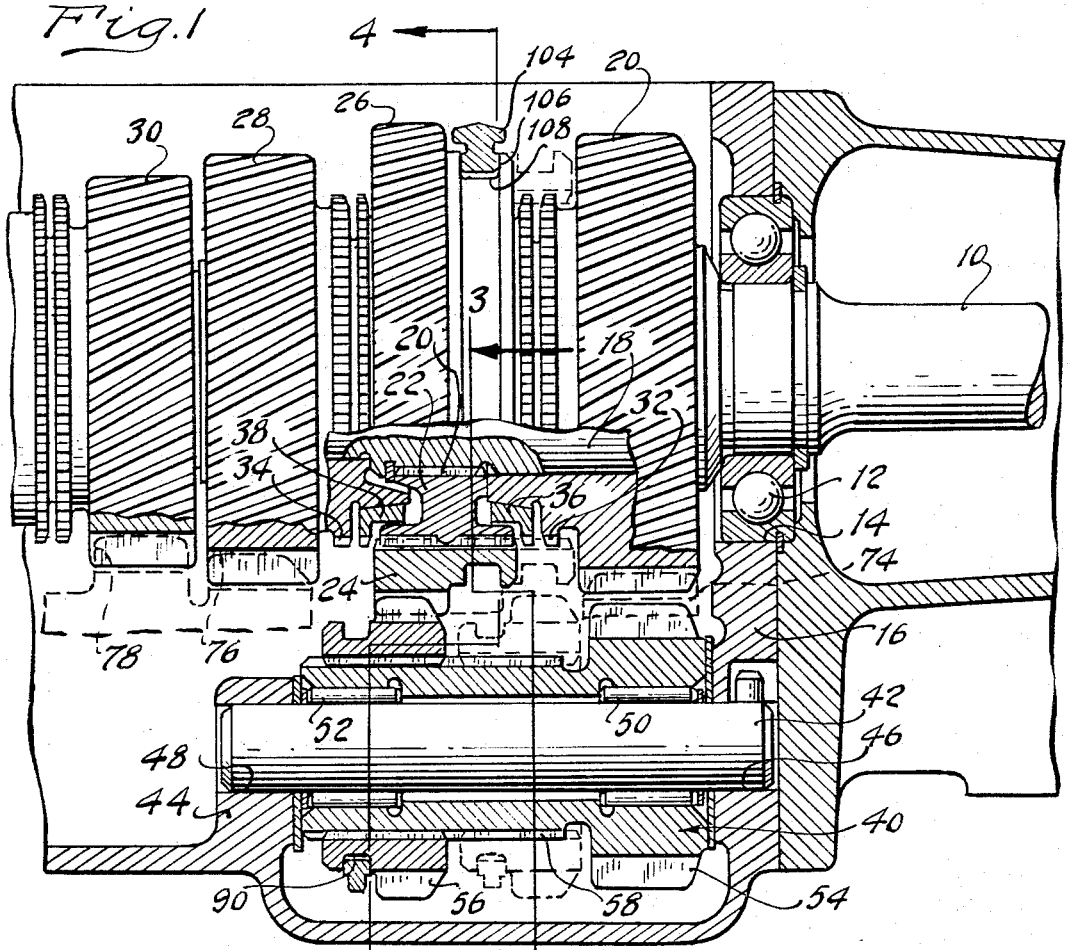
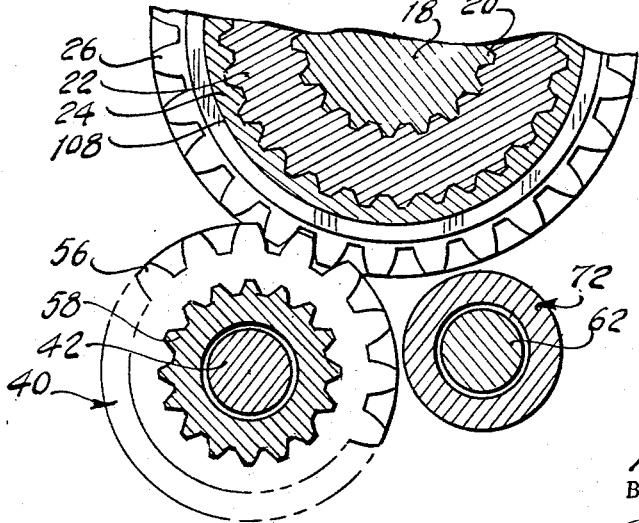
INVENTOR:
PETER G. IVANCHICH
BY John A. Faulkner
and Donald J. Harrington
ATTORNEYS

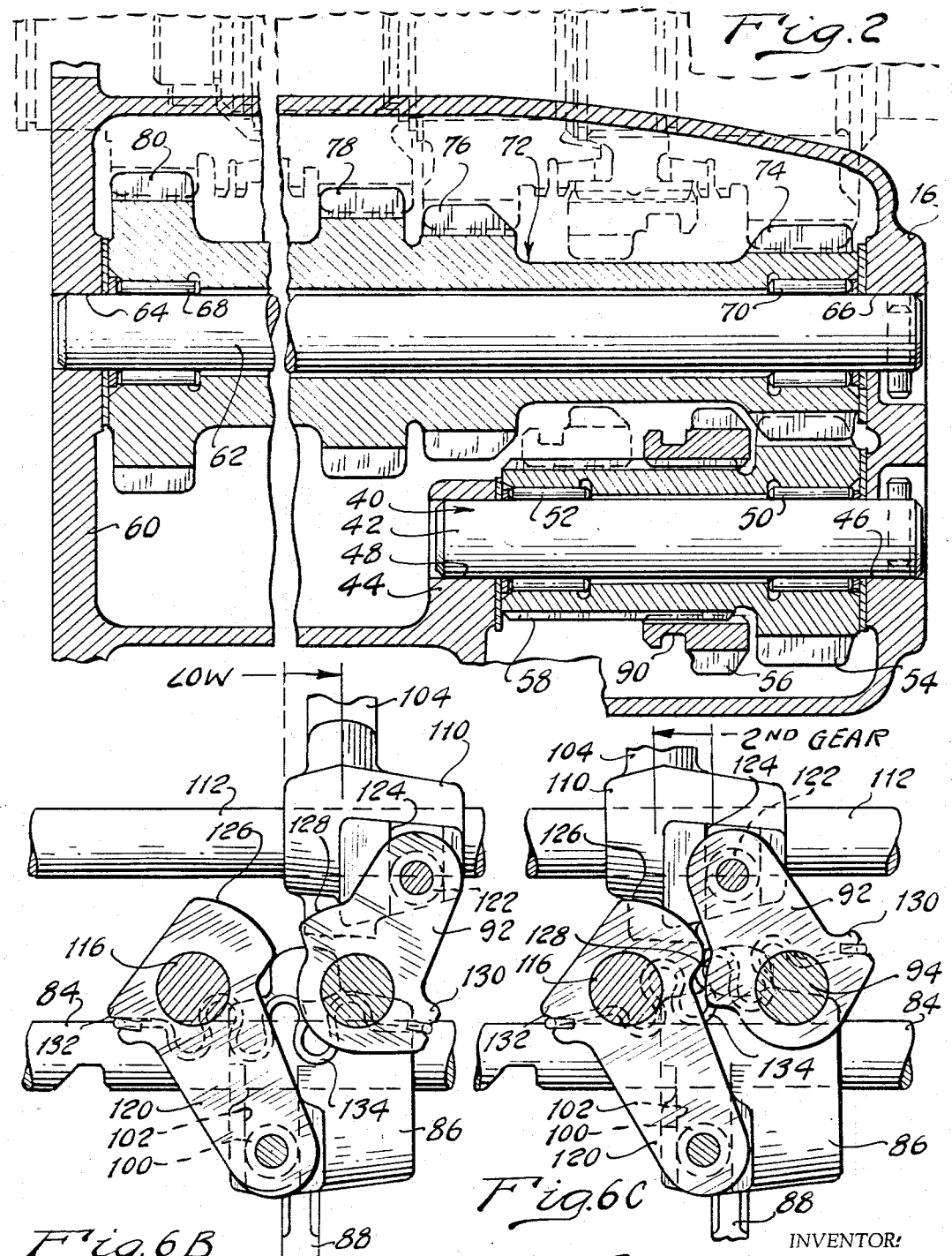

INVENTOR:
PETER G. IVANCHICH
ATTORNEYS

Dec. 20, 1966 P. G. IVANCHICH 3,292,442
SHIFT LINKAGE FOR MANUALLY CONTROLLED
POWER TRANSMISSION MECHANISM
Filed Nov. 2, 1964 4 Sheets-Sheet 4
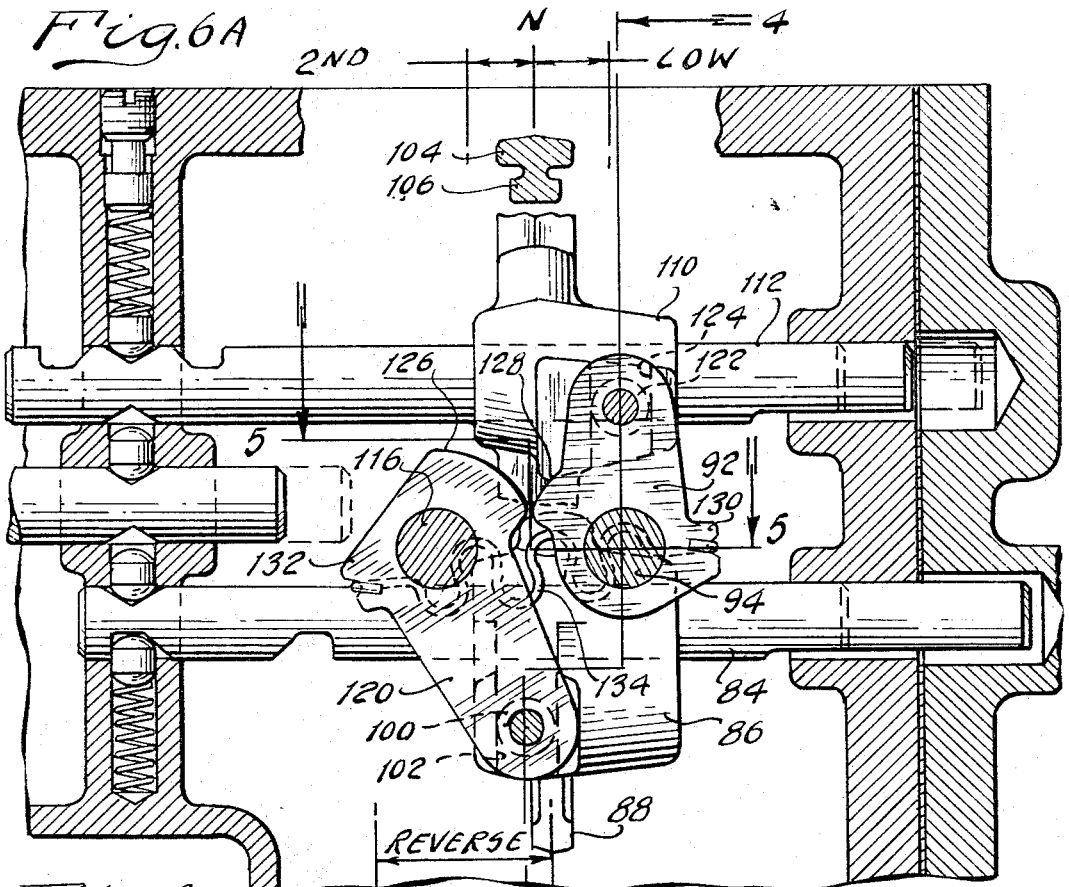
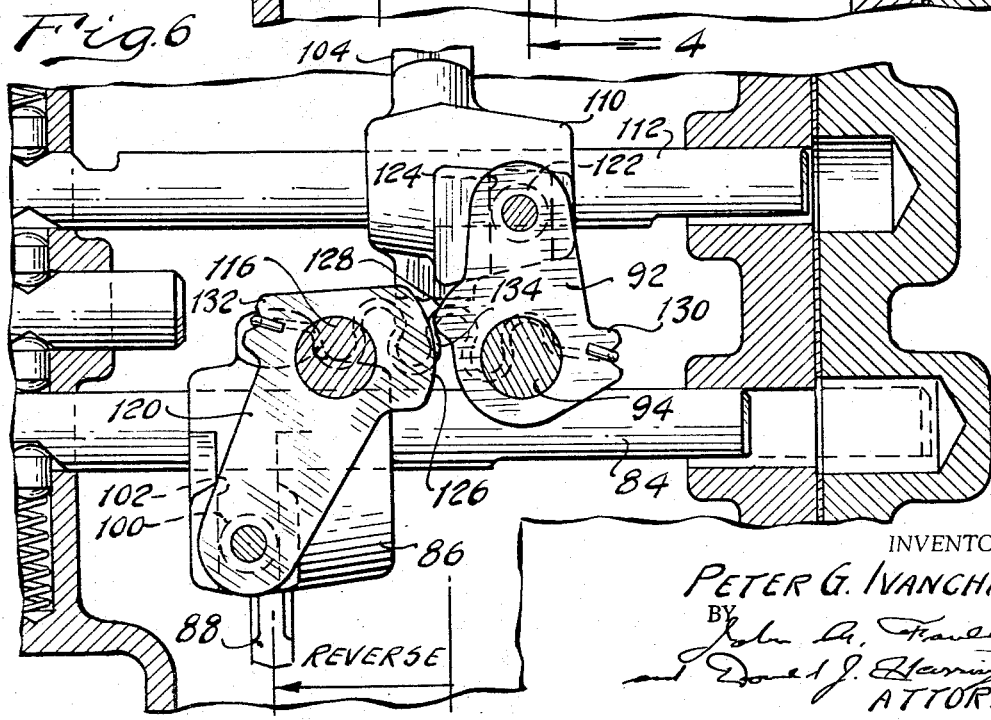
INVENTOR:
PETER G. IVANCHICH
BY
ATTORNEYS United States Patent Office 3,292,442
Patented Dec. 20, 1966

3,292,442
SHIFT LINKAGE FOR MANUALLY CONTROLLED
POWER TRANSMISSION MECHANISM
Peter George Ivanchich, Dearborn, Mich., assignor to Ford Motor Company, Dearborn, Mich., a corporation of Delaware
Filed Nov. 2, 1964, Ser. No. 407,978
7 Claims. (Cl. 74—335)

My invention relates generally to manually controlled power transmission mechanisms of the type disclosed in my copending application, Serial No. 303,788, filed August 22, 1963. More particularly, my invention relates to an improved mechanical linkage system for controlling the operation of the synchronizer clutch structures in a gear system of the type disclosed in my copending application. Reference may be had to my copending application for the purpose of supplementing this disclosure.

My improved gear linkage system is adapted to be used in a power transmission mechanism having torque delivery gear elements that establish plural torque delivery paths between coaxially disposed driving and driven shafts. A power input gear is connected to the driving shaft, and torque delivery gears are mounted for rotation about an intermediate shaft that forms a part of the driven shaft. The power input gear and each of the several torque delivery gears are adapted to mesh with separate gear elements of a cluster gear assembly that is rotatably mounted for rotation about an axis spaced from and parallel to the common axis of the driving and driven shafts.

A reverse drive pinion is mounted for rotation about a third axis that is parallel to the axes of the countershaft and the intermediate shaft. This pinion includes a portion that is engageable with one gear element of the cluster gear assembly.

To establish reverse drive, one of the power output gears is used to mesh with the reverse drive pinion, the latter causing the intermediate shaft to be driven in a direction opposite the direction of rotation of the driving shaft. The reverse drive power output gear is nonrotatably mounted upon the intermediate shaft but is capable of shifting axially into and out of engagement with the reverse drive pinion to establish and interrupt the reverse power flow path.

Any one of several forward driving speed ratios can be obtained by selectively clutching the other torque delivery gears to the intermediate shaft. This is done by means of a synchronizer clutch system that includes synchronizer clutch sleeves that shift axially with respect to the cooperating gears. The sleeves are held rotatably fast upon the intermediate shaft. Direct, forward drive is accomplished by clutching the power input gear to the intermediate shaft.

The various positions of the synchronizer clutch sleeves are established by means of a suitable linkage detent system. It has been found in practice, however, that due to malfunctioning of the detent system, it is possible for the synchronizer sleeves to be shifted during operation to a position that does not correspond fully to either the respective clutch engaging positions or to the positions corresponding to a fully disengaged condition. This gives rise to a partial clutch engagement and partial loading of the synchronizer clutch teeth.

A portion of the same detent system that is associated with the synchronizer clutch sleeves is used also to establish both the reverse drive position and the neutral position for the reverse pinion and the cooperating reverse drive gear. Malfunctioning of this portion of the detent system again may cause partial loading of the gear teeth of the reverse gear and the reverse drive pinion. Both of these partial loading conditions accelerate wear and produce premature failure.

It is an object of my invention to overcome the shortcomings mentioned in the foregoing paragraphs by providing a shift linkage system that will establish definite operating positions for the shift linkage elements employed for actuating the synchronizer clutch sleeves, the reverse drive gear and the reverse drive pinion in a manually controlled, power transmitting gear mechanism.

It is a further object of my invention to provide a linkage system of the type above set forth wherein the linkage elements that actuate the reverse pinion move from a so-called neutral disengaged position to either a fully engaged position or a fully disengaged position with a snap action under spring pressure. While a companion linkage element for establishing either of two underdrive gear ratios is maintained in a neutral position.

It is a further object of my invention to provide a linkage system of the type above set forth wherein the snap action feature is introduced also for the companion linkage element while the linkage element employed for shifting the reverse drive pinion is maintained in the so-called neutral or released position.

It is a further object of my invention to provide an interlock system that is inherent in the linkage elements above described so that one linkage element cannot be moved to a torque delivery position while its companion linkage element is in a torque delivery position.

For the purpose of describing more particularly the improvements of my invention, reference will be made to the accompanying drawings, wherein:

FIGURE 1 is a partial cross sectional assembly view of a power transmission mechanism capable of embodying the improved linkage system of my invention. It is taken along the plane of section line 1—1 of FIGURE 4;

FIGURE 2 is a cross sectional assembly view showing a cluster gear assembly which forms a part of the mechanism of FIG. 1. It is taken along the plane of section line 2—2 of FIGURE 4;

FIGURE 3 is a transverse cross sectional view taken along the plane of section line 3—3 of FIGURE 1;

FIGURE 6 is a cross sectional view taken along the plane of section line 6A—6A of FIGURE 5; and FIGURES 6A, 6B and 6C show in different operating positions the linkage elements of FIGURE 6.

Figure 4:
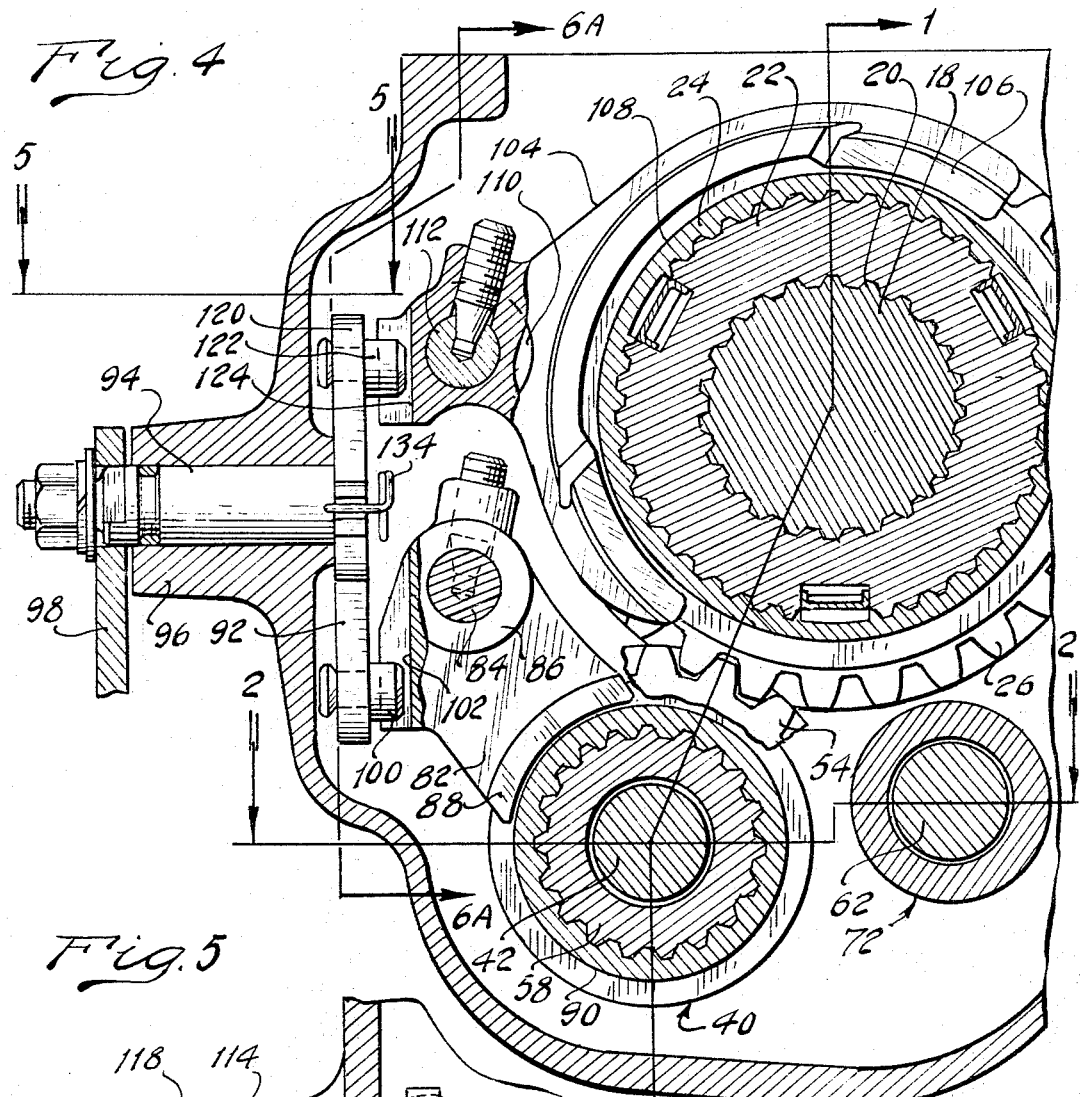
FIGURE 4 is a transverse cross sectional view taken along the plane of section line 4—4 of FIGURE 1.

Referring first to FIGURE 1, numeral 10 designates a driven shaft for a power transmission mechanism in an automotive vehicle driveline. It may be connected through a suitable drive shaft and a differential and axle assembly to the vehicle traction wheels. It is journaled rotatably by means of bearing 12 within an opening 14 formed in a transmission housing end wall 16.

An intermediate power delivery shaft 18 is connected to or formed integrally with shaft 10. A first speed ratio underdrive gear 20 is journaled rotatably upon intermediate shaft 10.

Splined to an etxernally splined portion 20 of intermediate shaft 18 is a synchronizer hub 22. An internally splined synchronizer clutch sleeve 24 is supported by the externally splined periphery of hub 22 and is adapted for axial shifting movement although relative rotation between sleeve 24 and the shaft 18 is inhibited. An external gear 26 is formed on the sleeve 24.

A second speed ratio underdrive gear 28 is rotatably journaled upon intermediate shaft 18. Similarly, a third speed ratio underdrive gear 30 is journaled upon intermediate shaft 18 directly adjacent gear 28.

Gear 20 includes synchronizer clutch teeth 32 and gear 28 includes corresponding synchronizer clutch teeth 34. The internally splined teeth of the sleeve 24 are adapted to engage drivably the teeth 32 or the teeth 34 as the sleeve 24 is shifted in a right hand direction or in a left hand direction respectively.

A synchronizer blocker ring 36 is situated between sleeve 24 and teeth 32. A corresponding synchronizer blocker ring 38 is situated between teeth 34 and sleeve 24. The synchronizer construction, together with the blocker rings, is of a conventional design that is familiar to persons skilled in this art. For a particular description of the synchronizer assembly, reference may be made to Armentraut Patent No. 2,676,684.

A reverse drive pinion assembly, designated generally by reference character 40, is journaled upon a pinion shaft 42 which is end supported by the housing wall 16 and by a boss 44, the latter forming a part of the housing. Wall 16 is formed with an opening 46 which receives one end of the shaft 42, and boss 44 is formed with a corresponding opening 48 which receives the other end of the shaft 42. The pinion assembly 40 is journaled upon shaft 42 by spaced needle bearings 50 and 52.

This pinion assembly 40 includes a first gear element 54 that meshes directly with first speed ratio gear element 74 of a cluster gear assembly subsequently to be described. A second gear element 56 also forms a part of the assembly 40. It is internally splined on an externally splined portion 58 of the assembly 40. Gear element 56 can be shifted axially upon the splined portion 58 although relative rotation between element 56 and the element 54 is inhibited.

The housing includes also a forward wall 60 that acts as a support for one end of a countershaft 62. An opening 64 is formed in the wall 60 to accommodate one end of the shaft 62. The wall 16 includes a second opening 66 which receives the other end of the shaft 62. Spaced needle bearings 68 and 70 rotatably support a cluster gear assembly 72 upon the shaft 62. The assembly 72 includes the first speed ratio gear element 74, a second speed ratio gear element 76, a third speed ratio gear element 78 and a power input gear element 80. Gear element 74 engages continuously the gear 20 and the gear elements 76 and 78 engage continuously gears 28 and 30 respectively. Gear element 74 engages also gear element 54 of the reverse pinion assembly 40 as indicated above.

When the gear element 56 is shifted to the dotted line position shown in FIGURE 1, and the gear 26 assumes the position shown in FIGURE 1, the reverse power flow path is interrupted. If, however, the gear element 56 is shifted in a left hand direction, a reverse power flow path is established. The path is defined by shaft 18, gear 26, gear element 56, gear element 54, gear element 74, gear 20 and power output shaft 10.

To establish first speed ratio operation, sleeve 24 is shifted in a right hand direction thereby locking gear 20 to the shaft 18. Gear element 56 assumes the dotted line position shown in FIGURE 1. Gear 80 engages a power input gear shown by means of phantom lines in FIGURE 2. The low speed ratio power flow path then is established by the power input gear element 80, gear element 74, gear 20 and power output shaft 10.

Second speed ratio operation is obtained by shifting the sleeve 24 in a left hand direction thereby locking gear 28 to the shaft 18. This automatically releases the gear 20 from the shaft 18. The reverse gear element 56 assumes the dotted line position for all forward driving speeds. The second speed ratio power flow path then is established by the power input gear element 80, gear element 76, gear 28, intermediate shaft 18 and power output shaft 10.

Third and fourth speed ratios are achieved by employing a third and fourth speed synchronizer clutch assembly (not shown). This locks gear 28 or gear 30 to the intermediate shaft 18. Reference may be had to my copending application, if desired, for a description of the mode of operation for third speed ratio operation and fourth speed ratio operation.

Figure 5:
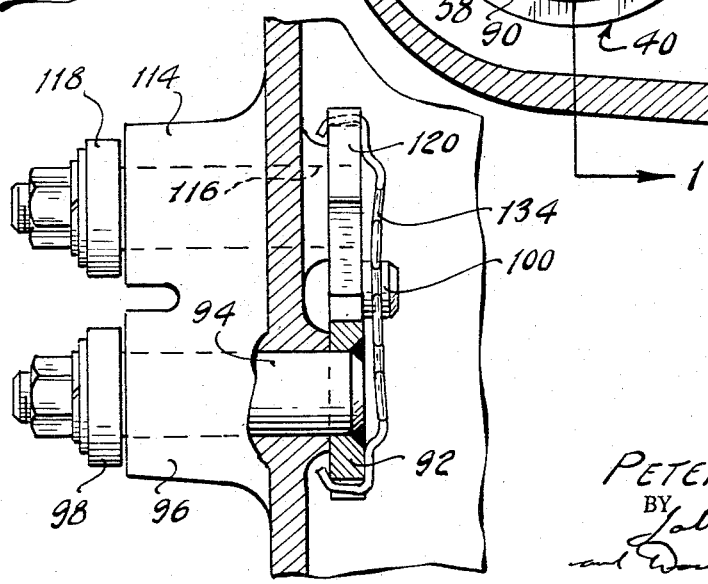
FIGURE 5 is a cross sectional view taken along the plane of section line 5—5 of FIGURE 4.

Referring next to FIGS. 4 and 5, the element 56 of the reverse pinion assembly is shifted by means of a shifter fork 82. This fork is connected to and carried by a reverse gear shift rail 84 which may be end supported by the transmission housing. Shifter fork 82 includes a collar 86 that surrounds rail 84. As the rail 84 is shifted in the direction of the common axis of the gears 30, 28 and 20, fork 82 also is shifted axially. The end 88 of the fork 82 engages a groove 90 formed in the element 56 of the reverse pinion assembly 40. Thus the element 56 can be shifted to either of its two operating positions illustrated in FIGURE 1.

A shift lever 92 is situated within the transmission housing and is supported by a shaft 94. This shaft is journaled within a boss 96 that forms a part of the housing. Keyed or splined to the external end of shaft 94 is a shift linkage element 98 which is under the control of the vehicle operator.

As shaft 94 is rotated by the operator, lever 92 oscillates about the axis of shaft 94 within the housing. The free end of lever 92 carries a finger element 100 that is received through a cooperating groove 102 formed in the shifter fork 82. Thus as linkage element 98 is rotated by the operator, the accompanying oscillatory movement of lever 92 will cause axial shifting movement of the fork 82 within the shift rod 84.

Another shifter fork is shown at 104. It includes finger portions 106 that are received within a groove 108 formed on gear 26. A collar 110 is formed on shifter fork 104 and a shift rail 112 is received through the opening in the collar 110. The fork 104 thus is secured to and supported by the rail 112. As the rail 112 is shifted axially, the gear 26 also is shifted in either one direction or the other.

The housing includes another external boss 114 within which is supported a shaft 116. The external end of shaft 116 has keyed or splined thereto a shift linkage element 118 that is under control of the vehicle operator. Secured to the inner end of the shaft 116 is a shift lever 120 which is adapted to oscillate about the axis of the shaft 116. The extended end of the lever 120 carries a finger element 122 that is received within a slot 124 formed in the collar 110 of shifter fork 104. Thus the gear 26 can be shifted in one direction or the other depending upon the direction of oscillation of the linkage element 118.

Referring next to FIGURE 6, the lever 120 incudes a cam portion 126 and the lever 92 includes a cam portion 128. A first spring anchor member 130 is formed on element 92 on the right hand side of the axis of shaft 94 as viewed in FIGURE 6. A corresponding spring anchor element 132 is formed on linkage element 120 on the left hand side of the axis of shaft 116 as viewed in FIGURE 6. The ends of a tension spring 134 engage the anchor elements 130 and 132 or the spring exerts a compressive force on the elements 92 and 120. When the elements 92 and 120 are positioned as shown in FIGURE 6, the line of action of the spring 134 is situated above the center lines for the shafts 94 and 116. If the lever 120 is shifted to the neutral position shown in FIGURE 6A, however, the line of action of the spring 134 shifts below the center lines for the shafts 94 and 116. The transition from the reverse drive position shown in FIGURE 6 to the neutral position shown in FIGURE 6A, and vice versa, is accompanied by a snap action by reason of the tension of the spring 134. This snap action feature establishes positively either operating position for the lever 120 with a full shifting movement. Full engagement of the reverse drive pinion 56 thus is assured during such movement of the lever 20. The lever 92 maintains a neutral position. as shown in FIGURES 6 and 6A, by means of a suitable detent mechanism in the manual control linkage system (not shown).

When the lever 120 assumes the reverse drive position shown in FIGURE 6, it is not possible for the lever 92 to be shifted inadvertently to the second speed ratio position since cam portions 126 and 128 provide interference that prevents such movement. Furthermore, the movement of the lever 120 from the position shown in FIGURE 6A to the position shown in FIGURE 6 will force the lever 92 to assume the neutral position shown if, for some reason, it has assumed some intermediate position between the neutral position and the second speed ratio position.

As explained previously, the reverse drive gear element 56 assumes the dotted line position shown in FIGURE 1 during opration in each forward driving speed ratio. This dotted line position corresponds to the position of the lever 120 shown in FIGURES 6A, 6B and 6C. When lever 120 is so positioned, lever 92 can be shifted from the neutral position to the low speed ratio position, as shown in FIGURE 6B, merely by appropriately moving the linkage element 98. If the lever 92 is shifted in the opposite direction to the position shown in FIGURE 6C, the mechanism is conditioned for second speed ratio operation. Under these conditions, the cam portions 128 and 126 will prevent inadvertent shifting movement of the lever 120 to the reverse drive position.

When the levers are positioned as shown in FIGURE 6 during operation of the mechanism in the first speed ratio, the line of action of the spring 134 falls below the axes of shafts 116 and 94. When the lever 92 is shifted to the second speed ratio position shown in FIGURE 6, however, the line of action of the spring 134 falls above the axis of shaft 94. Thus movement of the lever 92 from the FIGURE 6B position to the FIGURE 6C position occurs with a snap action. Conversely, movement from the FIGURE 6C position to the FIGURE 6B position also occurs with a snap action. Thus the two operating positions for the lever 92 are definitely established and full shifting movement of the sleeve 24 to either one or the other of its operating positions is assured. Undesirable partial engagement of the synchronizer clutch teeth then is avoided. The spring tension of the spring 134, in addition to establishing definite operating positions for the various levers, functions also to maintain the levers in their positions once they are established. Inertia forces and vibrations that are experienced during operation, thus will not cause unwanted shifting movement of the synchronizer clutch sleeves or the reverse drive pinion.

By preference, the spring 134 is formed with convolutions that are located in a single plane as distinct from a more conventional coil spring. This makes it possible to locate the spring in its assembled position with a minimum space requirement.

Having thus described a preferred embodiment of my invention, what I claim and desire to secure by U.S. Letters Patent is:

1. In a power transmission mechanism adapted to deliver driving torque from a driving member to a driven member, a plurality of power output gears rotatably journaled for rotation about the axis of said power output shaft, a cluster gear assembly engageable with said gears, said cluster gear assembly being connected to driving portions of said mechanism, a reverse pinion assembly rotatably journaled for rotation about an axis that is spaced from and parallel to the axes of said cluster gear assembly and said power output shaft, a gear portion of said reverse pinion assembly being in continuous meshing engagement with one of said power output gears, synchronizer clutch means for selectively connecting a pair of said power output gears to said driven shaft and including a shiftable clutch sleeve movable in opposed axial directions, a reverse gear formed on said synchronizer clutch sleeve, another element of said reverse pinion assembly being engageable with said reverse gear when the latter assumes a position intermediate its two forward drive operating positions, a manually operable linkage system for shifting said synchronizer sleeve and said other portion of said reverse drive pinion, said linkage system including two shift levers respectively connected to said synchronizer sleeve and said reverse pinion portion, said shift levers being mounted for rotation about parallel axes and situated in adjacent relationship for oscillation in a substantially common plane, and spring means for exerting a spring force along a line of action that is adapted to shift from one side of the axis for one lever to the other as one lever is oscillated from one operating position to the other.

2. In a power transmission system adapted to deliver driving torque from a driving member to a driven member, rotatable torque delivery elements defining multiple torque delivery paths between said driving member and said driven member, each path being characterized by a separate driving torque ratio, a personally operable linkage means for shifting said torque delivery elements from one operating position to another to condition said mechanism for a speed ratio change, said linkage means comprising a pair of shift levers mounted for oscillation about two parallel axes, said shift levers being adapted to oscillate about their respective axes in a substantially common plane, and spring means for exerting a spring force upon said levers along a line of action that is displaced from one side of the axis of one lever to the other as one lever is oscillated from one operating position to the other whereby movement of the latter lever is accompanied by a snap action.

3. In a power transmission system adapted to deliver driving torque from a driving member to a driven member, rotatable torque delivery elements defining multiple torque delivery paths between said driving member and said driven member, each path being characterized by a separate driving torque ratio, a personally operable linkage means for shifting said torque delivery elements from one operating position to another to condition said mechanism for a speed ratio change, said linkage means comprising a pair of shift levers mounted for oscillation about two parallel axes, said shift levers being adapted to oscillate about their respective axes in a substantially common plane, and spring means for exerting a spring force upon said levers along a line of action that is displaced from one side of the axis of one lever to the other as one lever is oscillated from one operating position to the other whereby movement of the latter lever is accompanied by a snap action, each lever having two operating positions, one lever being movable from one operating position to the other when its companion lever assumes a position intermediate its two respective operating positions, and cam portions disposed on the adjacent sides of said levers, one cam portion being adapted to interfere with the other cam portion to prevent simultaneous movement of each lever to their respective operating positions thereby preventing the simultaneous establishment of two torque delivery paths.

4. In a power transmission system adapted to deliver driving torque from a driving member to a driven member, rotatable torque delivery elements defining multiple torque delivery paths between said driving member and said driven member, each path being characterized by a separate driving torque ratio, a personally operable linkage means for shifting said torque delivery elements from one operating position to another to condition said mechanism for a speed ratio change, said linkage means comprising a pair of shift levers mounted for oscillation about two parallel axes, said shift levers being adapted to oscillate about their respective axes in a substantially common plane, and spring means for exerting a spring force upon said levers along a line of action that is displaced from one side of the axis of one lever to the other as one lever is oscillated from one operating position to the other whereby movement of the latter lever is accompanied by a snap action, a transmission housing enclosing said gear elements, a pair of shafts journalled in said housing in spaced parallel relationship, a separate one of said levers being connected to each shaft in the interior of said housing.

5. In a power transmission system adapted to deliver driving torque from a driving member to a driven member, rotatable torque delivery elements defining multiple torque delivery paths between said driving member and said driven member, each path being characterized by a separate driving torque ratio, a personally operable linkage means for shifting said torque delivery elements from one operating position to another to condition said mechanism for a speed ratio change, said linkage means comprising a pair of shift levers mounted for oscillation about two parallel axes, said shift levers being adapted to oscillate about their respective axes in a substantially common plane, and spring means for exerting a spring force upon said levers along a line of action that is displaced from one side of the axis of one lever to the other as one lever is oscillated from one operating position to the other whereby movement of the latter lever is accompanied by a snap action, each lever having two operating positions, one lever being movable from one operating position to the other when its companion lever assumes a position intermediate its two respective operating positions, and cam portions disposed on the adjacent sides of said levers, one cam portion being adapted to interfere with the other cam portion to prevent simultaneous movement of each lever to their respective operating positions thereby preventing the simultaneous establishment of two torque delivery paths, a transmission housing enclosing said gear elements, a pair of shafts journalled in said housing in spaced parallel relationship, a separate one of said levers being connected to each shaft in the interior of said housing.

6. In a power transmission system adapted to deliver driving torque from a driving member to a driven member, rotatable torque delivery elements defining multiple torque delivery paths between said driving member and said driven member, each path being characterized by a separate driving torque ratio, a personally operable linkage means for shifting said torque delivery elements from one operating position to another to condition said mechanism for a speed ratio change, said linkage means comprising a pair of shift levers mounted for oscillation about two parallel axes, said shift levers being adapted to oscillate about their respective axes in a substantially common plane, and spring means for exerting a spring force upon said levers along at line of action that is displaced from one side of the axis of one lever to the other as one lever is oscillated from one operating position to the other whereby movement of the latter lever is accompanied by a snap action, a transmission housing enclosing said gear elements, a pair of shafts journaled in said housing in spaced parallel relationship, a separate one of said levers being connected to each shaft in the interior of said housing, said spring means comprising a prestressed convoluted wire having convolutions located in a common plane that is parallel to the plane of oscillation of said levers.

7. In a power transmission system adapted to deliver driving torque from a driving member to a driven member, rotatable torque delivery elements defining multiple torque delivery paths between said driving member and said driven member, each path being characterized by a separate driving torque ratio, a personally operable linkage means for shifting said torque delivery elements from one operating position to another to condition said mechanism for a speed ratio change, said linkage means comprising a pair of shift levers mounted for oscillation about two parallel axes, said shift levers being adapted to oscillate about their respective axes in a substantially common plane, and spring means for exerting a spring force upon said levers along a line of action that is displaced from one side of the axis of one lever to the other as one lever is oscillated from one operating position to the other whereby movement of the latter lever is accompanied by a snap action, each lever having two operating positions, one lever being movable from one operating position to the other when its companion lever assumes a position intermediate its two respective operating positions, and cam portions disposed on the adjacent sides of said levers, one cam portion being adapted to interfere with the other cam portion to prevent simultaneous movement of each lever to their respective operating positions thereby preventing the simultaneous establishment of two torque delivery paths, a transmission housing enclosing said gear elements, a pair of shafts journaled in said housing in spaced parallel relationship, a separate one of said levers being connected to each shaft in the interior of said housing, said spring means comprising a prestressed convoluted wire having convolutions located in a common plane that is parallel to the plane of oscillation of said levers.

References Cited by the Examiner

UNITED STATES PATENTS

| 2,195,269 | 3/1940 | Coughtry | 74—477 |
| 2,252,042 | 8/1941 | Sinclair | 74—189.5 |

FOREIGN PATENTS 917,651  2/1954  Germany.

DAVID J. WILLIAMOWSKY, *Primary Examiner.*

H. S. LAYTON, *Assistant Examiner.*